United States Patent [19]

McDaniel

[11] 4,144,356
[45] Mar. 13, 1979

[54] FRIEDCAKE AND STICK MEMBER COMBINATION AND PROCESS FOR MAKING SAME

[76] Inventor: Diana G. McDaniel, 427 NW. 20th, Oklahoma City, Okla. 73103

[21] Appl. No.: 790,548

[22] Filed: Apr. 25, 1977

[51] Int. Cl.² ............................................. A21D 8/00
[52] U.S. Cl. .................................... 426/91; 426/134; 426/421; 426/439
[58] Field of Search ................... 426/94, 91, 134, 302, 426/549, 439, 104, 421, 496, 497, 391, 438, 440, 441

[56] References Cited

U.S. PATENT DOCUMENTS

| 2,585,364 | 2/1952 | Wright et al. ........................ 426/302 |
| 3,656,968 | 4/1972 | Allen ................................ 426/439 X |
| 3,804,956 | 4/1974 | Bongiovanni ..................... 426/134 X |

FOREIGN PATENT DOCUMENTS 1214983  12/1970  United Kingdom ..................... 426/134

OTHER PUBLICATIONS

The Evening Star, Oct. 23, 1939, p. 12.

*Primary Examiner*—Steven L. Weinstein
*Attorney, Agent, or Firm*—Dunlap, Codding & McCarthy

[57] ABSTRACT

A friedcake food product bonded to a stick member wherein a dough having suitable tacky character is placed on the stick member so as to surround a first stick portion, a second stick portion projecting from the dough portion. The dough is fried in deep fat for a controlled period of time so that the dough is fried while the dough portion immediately contacting the first stick portion is maintained in a tacky state to retainingly bond the fried dough portion to the stick member.

9 Claims, 4 Drawing Figures

U.S. Patent  Mar. 13, 1979  4,144,356 ic_patent_text

FRIEDCAKE AND STICK MEMBER COMBINATION AND PROCESS FOR MAKING SAME

BACKGROUND OF THE INVENTION

1. Field of the Invention

The present invention relates to the field of food preparations, and more particularly, but not by way of limitation, to a new friedcake food product bonded to a stick member or the like.

2. Description of the Prior Art

Friedcake products are cakes or the like that take the form of rings, twist, balls, or strips that are fried in deep fat, such as doughnuts or crullers. While such food preparations have always been popular, there has been a great expansion of doughnut shops and the like in this country within the last decade. The growth has been part of the advent of the fast food industry, which has seen unparalleled growth.

The fast food industry has thrived upon foods that are capable of mass preparation. Also, the public's pallet, which has often seemed insatiable, has demanded a range of confections that are readily available, quickly consumable and easily handled.

Doughnuts and related pastries continue to be a great favorite, but these do have the drawback of being somewhat messy and difficult to handle. This presents a problem similar to that which was encountered by frozen confections before the invention of popsicle and eskimo pie type confections, which presented a way of bonding frozen confections items to stick handles. However, prior to the present invention, efforts to provide such handling convenience to sweetbread pastries and the like have not proved completely adequate. An example of one solution along this line is the dunking doughnut, which is a doughnut having a tab portion that can be used to hold the doughnut while eating the remaining portion of the doughnut.

In nonpastries, an example of a food article on a stick member is the corndog, which is a food item that is prepared by inserting a stick member in a weiner, dipping the weiner in corn batter, and frying the batter. But this combination, like the familiar candied apple on a stick, is a combination of more than one element, and such a food article-stick member combination has not heretofore been available where the food portion is of unitary constituency.

SUMMARY OF INVENTION

The present invention provides a friedcake food product and process for making the same wherein dough is made having a tacky character; a portion of the dough is placed on a stick member so that a first stick portion is embedded therein and a second stick portion extends as a handle; the dough portion is quickly fried in deep fat for a controlled period of time until the outside of the dough portion is fried; and the frying is terminated while the dough portion immediately contacting the first stick portion remains essentially uncooked and therefore remains tacky so that the dough portion is retainingly bonded to the stick member.

The resultant product is a friedcake product that is rigidly bonded to a stick member for easy handling, and which may be further treated in a plurality of ways to create a large range of pastry items.

Accordingly, an object of the present invention is to provide a friedcake food product that is bonded to a stick member or the like. Another object of the present invention is to provide a friedcake food product in combination with a novel handling means that can be served in a large variety of sweetmeats or confections.

Other objects, advantages and features of the present invention will become clear from the following detailed description of the preferred embodiment of the invention when read in conjunction with the drawings and appended claims.

DESCRIPTION OF THE INVENTION

Figure 1:
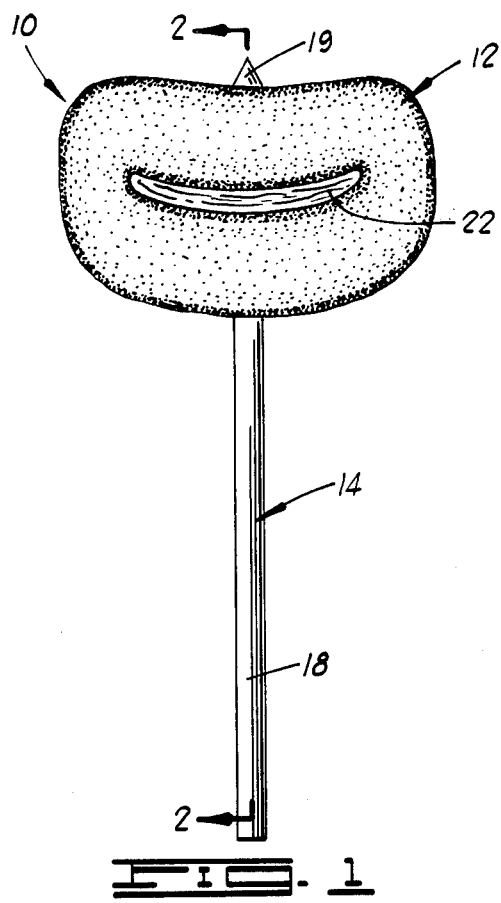
FIG. 1 is an elevational view of one type of friedcake food product prepared in accordance with the present invention.

Referring to the drawings in general, and to FIG. 1 in particular, shown therein is a friedcake food product 10 prepared in accordance with the present invention.

Figure 2:
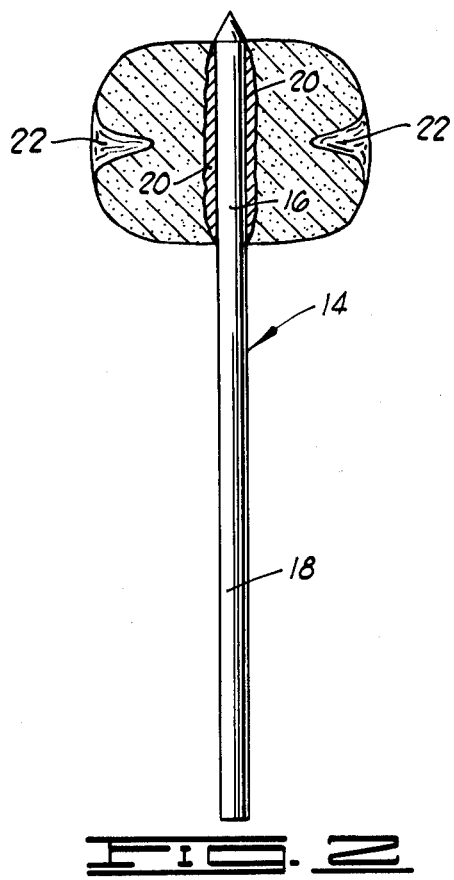
FIG. 2 is a cut away view taken at 2—2 in FIG. 1.

The friedcake 10 is comprised of a dough portion 12 and a stick member 14. As shown in FIG. 2, which is a cut away of the friedcake 10 at 2—2 in FIG. 1, the stick member 14 has a first stick portion 16 that is embedded in the dough portion 12. The stick member 14 also has a second stick portion 18 that serves as a handle for a person to hold the friedcake 10 while eating it. The end 19 of the stick member 14 is shaped to form a sharp point so that the stick member 14 can be easily inserted into the dough portion 12.

The friedcake 10 is prepared by making a dough that is sufficiently tacky so that the dough portion 12 will adhere rather tightly to the stick member 14 when in the uncooked state. While several recipes are available for such a dough, a very satisfactory dough recipe is a follows: ½ cup warm water; two packages of active dry yeast (approximately 6 ounces by weight); 1¾ cups of lukewarm water or scalded milk, between approximately 65° F. to 75° F.; approximately 7 cups all purpose flour; 3 tablespoons of sugar; 1 tablespoon of salt; and 2 tablespoons of soft shortening.

Mix the warm water, the yeast and the lukewarm water (or scalded milk), and stir in the remaining ingredients. Let this dough mixture set for approximately 15 minutes. Punch down and knead the dough for approximately 10 minutes. Allow the dough to rise for approximately 1 hour. Punch out and divide into smaller portions to facilitate further handling.

The dough is then rolled and cut into suitably sized portions, and each portion is mounted on a stick member 14. It is preferable to proof the dough portions on the stick members for approximately 45 minutes at about 115° F. with some moisture to prevent drying the dough. While proofing produces a lighter product, proofing is not necessary to practice the present invention.

Next, the raised dough on each of the stick members 14 is cooked in a deep fat frier. While some may prefer a submersible frier, the dough portion 12 and its accompanying stick member 14 may be floated on the hot fat. An acceptable fat temperature is 375° F.

It is important that the dough portion 12 not be overcooked. Using the above cooking method, it has been found that a 30 second fry on each side of the dough portion 12 is quite satisfactory. Once the outside of the dough portion 12 has been fried, the friedcake 10 must be carefully removed from the deep fat frier, and the stick member 14 must not be touched until the friedcake 10 is cool. The reason for this is that the result of even slight movement of the stick member 14 relative to the dough portion 12 will loosen the stick member 14, and the stick member 14 will simply fall out. Even glazing or icing operations can sometimes exert pressures too great for the bond between the stick member 14 and the dough portion 12 to withstand. However, once the friedcake 10 has cooled, quite suprisingly, the dough portion 12 will cling very tenaciously to the stick member 14.

The reason that the dough portion 12 bonds to the stick member 14 is believed to be as follows. Destructive analysis of the friedcake 10 reveals a layer 20 of dough portion 12 remains in its tacky state and clings to the stick member 14. Evidently this is caused by the combined effect of the quick frying of the dough portion 12 and the first stick portion 16, which together serve to temporarily insulate the dough portion 12 immediately next to the stick member 14 so that the tacky layer 20 is preserved.

The nature of the transition bond between the layer 20 and the remaining portion of the dough portion 12 is not fully understood, but it is known that this transition bond is very tenuous when the frying process is first terminated and that the transition bond strengthens during the cooling process.

Many possibilities exist for creating a large range of friedcake confections by the use of the above described method. For example, the shape of the dough portion 12 of FIG. 1 is made by forming a doughnut shaped portion of dough, and then gently closing the hole portion by squeezing the dough portion into the shape shown. The hole portion, upon closing, will form a smile line 22 that can be filled with icing as shown, if desired.

Figure 3:
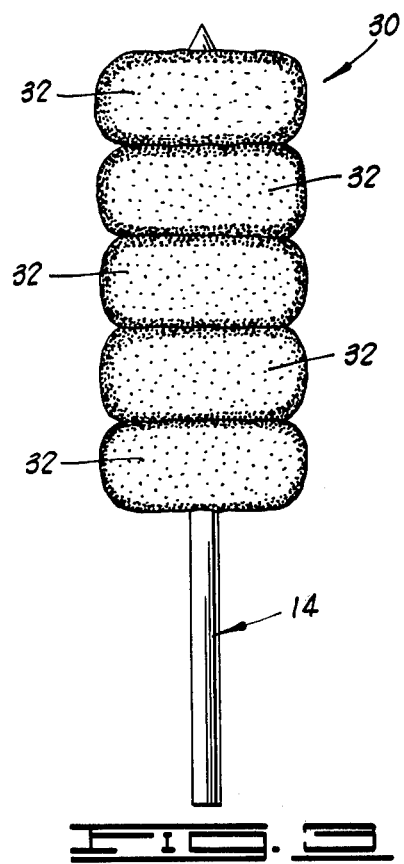
FIG. 3 is an elevational view of another type of friedcake food product prepared in accordance with the present invention.

Many shapes may be used. FIG. 3 shows a friedcake 30 made of a series of doughnut hole members 32. That is, each of the doughnut hole members 32 is what is cut out of a doughnut dough portion to create the doughnut hole. The present invention offers the very usable benefit of making pastry creations formed from all manner of scrap dough portions without the need for recombining the scraps and rerolling, thus offering a considerable savings of bakery personnel time.

Figure 4:
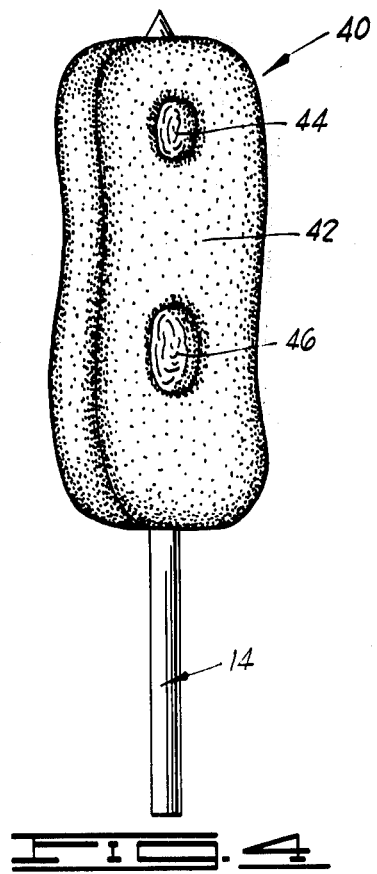
FIG. 4 is an elevational view of yet another type of friedcake food product prepared in accordance with the present invention.

Another friedcake 40 is shown in FIG. 4 in which a rectangularly shaped dough portion 42, commonly known as a long john has been threaded onto a stick member 14. That is, the dough portion 42 was formed into an S-shape on the stick member 14 while raw, and where the stick member 14 passed through the sides of the long john has formed the depressions 44 and 46 when the dough has been proofed. Once the dough portion 42 is cooked, the depressions 44 can be filled with icing or jelly, as desired.

Of course, it will be understood that the friedcakes 30 and 40 have been prepared in accordance with the above described process, and the dough portions 32 and 42 are thereby caused to be retainingly bonded to the respective stick members 14.

It is clear that the presently described invention provides a friedcake food product which is a new pastry confection that may be formed into various shapes which have handle members attached thereto for providing ease in handling. Also, it is clear that the other objects, advantages and features described hereinabove are fully met by the described invention. It will be recognized that changes may be made in the construction and arrangement of the parts and elements of the embodiments disclosed herein without departing from the spirit and scope of the invention as defined in the following claims.

What is claimed is:

1. The process of making a friedcake food product comprising the steps of:
    making a dough that is sufficiently tacky so that said dough will adhere rather tightly to a stick member when the dough is in an uncooked state;
    bringing a stick member into contact with a portion of the tacky dough so that the stick member has a first stick portion surrounded by the dough portion and a second stick portion extending from the dough portion as a handle;
    placing the dough portion which surrounds the first stick portion in hot deep fat so that the outside of the dough portion is quickly fried; and
    terminating the frying by removing the dough portion from the deep fat while the inside of the dough portion immediately contacting the first stick portion remains essentially uncooked and therefore tacky so that the dough portion remains bonded to the stick member.

2. The process of claim 1 further comprising the step of cooling the dough portion after removal from the deep fat.

3. The process of claim 2 further comprising the step of icing the dough portion after the dough portion has cooled.

4. The process of claim 1, after the dough portion has been contacted by the stick member and before the dough portion is placed in the deep fat, the process is further characterized as comprising the step of proofing the dough portion.

5. The process of claim 4 wherein the hot deep fat is approximately 375° F. and the proofing is characterized as placing the dough portion in hot, moist air at about 115° F. for approximately 45 minutes.

6. A friedcake food product produced by the process of claim 1.

7. The friedcake of claim 6 further comprising a confectionary glaze supported by the dough portion.

8. The friedcake of claim 6 wherein the dough portion is shaped generally as a long john.

9. The friedcake of claim 6 wherein a plurality of dough portions are supported on the stick member.

* * * * *